United States Patent
Funk et al.

(10) Patent No.: US 7,934,092 B2
(45) Date of Patent: *Apr. 26, 2011

(54) ELECTRONIC DEVICE HAVING IMPROVED SECURITY

(75) Inventors: David William Funk, Balmain (AU);
Kia Silverbrook, Balmain (AU)

(73) Assignee: Silverbrook Research Pty Ltd,
Balmain, New South Wales (AU)

( * ) Notice: Subject to any disclaimer, the term of this patent is extended or adjusted under 35 U.S.C. 154(b) by 1296 days.

This patent is subject to a terminal disclaimer.

(21) Appl. No.: 11/482,967

(22) Filed: Jul. 10, 2006

(65) Prior Publication Data
US 2008/0022083 A1    Jan. 24, 2008

(51) Int. Cl.
*H04L 29/06* (2006.01)

(52) U.S. Cl. ..... 713/166; 358/1.15; 358/1.16; 358/1.18; 347/16; 347/19

(58) Field of Classification Search ............... 713/1, 2, 713/166; 726/16; 358/1.13, 1.15, 1.16, 1.18; 709/218; 347/5, 71, 16, 19
See application file for complete search history.

(56) References Cited

U.S. PATENT DOCUMENTS

| | | | |
|---|---|---|---|
| 5,684,948 A | 11/1997 | Johnson et al. | |
| 5,913,058 A * | 6/1999 | Bonola | 713/2 |
| 5,956,487 A * | 9/1999 | Venkatraman et al. | 709/218 |
| 6,467,087 B1 | 10/2002 | Yang | |
| 6,604,817 B2 * | 8/2003 | Isono et al. | 347/71 |
| 6,809,830 B1 * | 10/2004 | Lafky | 358/1.13 |
| 6,895,508 B1 * | 5/2005 | Swanberg et al. | 726/16 |
| 7,043,166 B2 | 5/2006 | Parry et al. | |
| 7,681,000 B2 | 3/2010 | Funk et al. | |
| 2003/0081620 A1 | 5/2003 | Danner et al. | |
| 2004/0133802 A1 | 7/2004 | Liu | |
| 2006/0221386 A1 | 10/2006 | Brooks et al. | |
| 2006/0288071 A1 | 12/2006 | Bigioi et al. | |

FOREIGN PATENT DOCUMENTS

| | | |
|---|---|---|
| EP | 0696772 A2 | 2/1996 |
| EP | 1603039 A2 | 12/2005 |
| GB | 2343031 A | 4/2000 |

OTHER PUBLICATIONS

SPARC International Inc., The SPARC Architecture Manual Version 8, 1992.

* cited by examiner

*Primary Examiner* — Thanhnga B Truong

(57) ABSTRACT

An electronic device comprising an embedded computer system is provided. The device comprises a processor supporting a real-time operating system (RTOS). The processor further supports user and supervisor modes. The computer system is programmed such that only code portions directly controlling essential hardware in the device are run in supervisor mode.

4 Claims, 2 Drawing Sheets

ELECTRONIC DEVICE HAVING IMPROVED SECURITY

FIELD OF THE INVENTION

This invention relates to an electronic device having an embedded computer system. It has been developed primarily for improving security and protecting the computer system from malicious software tampering, whilst still allowing flexibility in software design downstream of the device manufacturer.

CO-PENDING APPLICATIONS

The following applications have been filed by the Applicant simultaneously with the present application:

| | | | | |
|---|---|---|---|---|
| CAG006US | CAG007US | CAG008US | CAG009US | CAG010US |
| CAG011US | FNE010US | FNE011US | FNE012US | FNE013US |

-continued

| | | | | |
|---|---|---|---|---|
| FNE015US | FNE016US | FNE017US | FNE018US | FNE019US |
| FNE020US | FNE021US | FNE022US | FNE023US | FNE024US |
| FNE025US | FNE026US | SBF001US | SBF002US | SBF003US |
| MCD062US | IRB016US | IRB017US | IRB018US | RMC001US |
| KPE002US | KPE003US | KPE004US | KIP001US | PFA001US |
| MTD001US | MTD002US | | | |

The disclosures of these co-pending applications are incorporated herein by reference. The above applications have been identified by their filing docket number, which will be substituted with the corresponding application number, once assigned.

CROSS REFERENCES TO RELATED APPLICATIONS

Various methods, systems and apparatus relating to the present invention are disclosed in the following U.S. Patents/Patent applications filed by the applicant or assignee of the present invention:

| | | | | | | |
|---|---|---|---|---|---|---|
| 09/517,539 | 6,566,858 | 6,331,946 | 6,246,970 | 6,442,525 | 09/517,384 | 09/505,951 |
| 6,374,354 | 09/517,608 | 6,816,968 | 6,757,832 | 6,334,190 | 6,745,331 | 09/517,541 |
| 10/203,559 | 10/203,560 | 10/203,564 | 10/636,263 | 10/636,283 | 10/866,608 | 10/902,889 |
| 10/902,833 | 10/940,653 | 10/942,858 | 10/727,181 | 10/727,162 | 10/727,163 | 10/727,245 |
| 10/727,204 | 10/727,233 | 10/727,280 | 10/727,157 | 10/727,178 | 10/727,210 | 10/727,257 |
| 10/727,238 | 10/727,251 | 10/727,159 | 10/727,180 | 10/727,179 | 10/727,192 | 10/727,274 |
| 10/727,164 | 10/727,161 | 10/727,198 | 10/727,158 | 10/754,536 | 10/754,938 | 10/727,227 |
| 10/727,160 | 10/934,720 | 11/212,702 | 11/272,491 | 10/296,522 | 6,795,215 | 10/296,535 |
| 09/575,109 | 6,805,419 | 6,859,289 | 6,977,751 | 6,398,332 | 6,394,573 | 6,622,923 |
| 6,747,760 | 6,921,144 | 10/884,881 | 10/943,941 | 10/949,294 | 11/039,866 | 11/123,011 |
| 6,986,560 | 7,008,033 | 11/148,237 | 11/248,435 | 11/248,426 | 10/922,846 | 10/922,845 |
| 10/854,521 | 10/854,522 | 10/854,488 | 10/854,487 | 10/854,503 | 10/854,504 | 10/854,509 |
| 10/854,510 | 10/854,496 | 10/854,497 | 10/854,495 | 10/854,498 | 10/854,511 | 10/854,512 |
| 10/854,525 | 10/854,526 | 10/854,516 | 10/854,508 | 10/854,507 | 10/854,515 | 10/854,506 |
| 10/854,505 | 10/854,493 | 10/854,494 | 10/854,489 | 10/854,490 | 10/854,492 | 10/854,491 |
| 10/854,528 | 10/854,523 | 10/854,527 | 10/854,524 | 10/854,520 | 10/854,514 | 10/854,519 |
| 10/854,513 | 10/854,499 | 10/854,501 | 10/854,500 | 10/854,502 | 10/854,518 | 10/854,517 |
| 10/934,628 | 11/212,823 | 10/728,804 | 10/728,952 | 10/728,806 | 6,991,322 | 10/728,790 |
| 10/728,884 | 10/728,970 | 10/728,784 | 10/728,783 | 10/728,925 | 6,962,402 | 10/728,803 |
| 10/728,780 | 10/728,779 | 10/773,189 | 10/773,204 | 10/773,198 | 10/773,199 | 6,830,318 |
| 10/773,201 | 10/773,191 | 10/773,183 | 10/773,195 | 10/773,196 | 10/773,186 | 10/773,200 |
| 10/773,185 | 10/773,192 | 10/773,197 | 10/773,203 | 10/773,187 | 10/773,202 | 10/773,188 |
| 10/773,194 | 10/773,193 | 10/773,184 | 11/008,118 | 11/060,751 | 11/060,805 | 11/188,017 |
| 11/298,773 | 11/298,774 | 11/329,157 | 6,623,101 | 6,406,129 | 6,505,916 | 6,457,809 |
| 6,550,895 | 6,457,812 | 10/296,434 | 6,428,133 | 6,746,105 | 10/407,212 | 10/407,207 |
| 10/683,064 | 10/683,041 | 6,750,901 | 6,476,863 | 6,788,336 | 11/097,308 | 11/097,309 |
| 11/097,335 | 11/097,299 | 11/097,310 | 11/097,213 | 11/210,687 | 11/097,212 | 11/212,637 |
| 11/246,687 | 11/246,718 | 11/246,685 | 11/246,686 | 11/246,703 | 11/246,691 | 11/246,711 |
| 11/246,690 | 11/246,712 | 11/246,717 | 11/246,709 | 11/246,700 | 11/246,701 | 11/246,702 |
| 11/246,668 | 11/246,697 | 11/246,698 | 11/246,699 | 11/246,675 | 11/246,674 | 11/246,667 |
| 11/246,684 | 11/246,672 | 11/246,673 | 11/246,683 | 11/246,682 | 10/760,272 | 10/760,273 |
| 10/760,187 | 10/760,182 | 10/760,188 | 10/760,218 | 10/760,217 | 10/760,216 | 10/760,233 |
| 10/760,246 | 10/760,212 | 10/760,243 | 10/760,201 | 10/760,185 | 10/760,253 | 10/760,255 |
| 10/760,209 | 10/760,208 | 10/760,194 | 10/760,238 | 10/760,234 | 10/760,235 | 10/760,183 |
| 10/760,189 | 10/760,262 | 10/760,232 | 10/760,231 | 10/760,200 | 10/760,190 | 10/760,191 |
| 10/760,227 | 10/760,207 | 10/760,181 | 10/815,625 | 10/815,624 | 10/815,628 | 10/913,375 |
| 10/913,373 | 10/913,374 | 10/913,372 | 10/913,377 | 10/913,378 | 10/913,380 | 10/913,379 |
| 10/913,376 | 10/913,381 | 10/986,402 | 11/172,816 | 11/172,815 | 11/172,814 | 11/003,786 |
| 11/003,616 | 11/003,418 | 11/003,334 | 11/003,600 | 11/003,404 | 11/003,419 | 11/003,700 |
| 11/003,601 | 11/003,618 | 11/003,615 | 11/003,337 | 11/003,698 | 11/003,420 | 6,984,017 |
| 11/003,699 | 11/071,473 | 11/003,463 | 11/003,701 | 11/003,683 | 11/003,614 | 11/003,702 |
| 11/003,684 | 11/003,619 | 11/003,617 | 11/293,800 | 11/293,802 | 11/293,801 | 11/293,808 |
| 11/293,809 | 11/246,676 | 11/246,677 | 11/246,678 | 11/246,679 | 11/246,680 | 11/246,681 |
| 11/246,714 | 11/246,713 | 11/246,689 | 11/246,671 | 11/246,670 | 11/246,669 | 11/246,704 |
| 11/246,710 | 11/246,688 | 11/246,716 | 11/246,715 | 11/246,707 | 11/246,706 | 11/246,705 |
| 11/246,708 | 11/246,693 | 11/246,692 | 11/246,696 | 11/246,695 | 11/246,694 | 11/293,832 |
| 11/293,838 | 11/293,825 | 11/293,841 | 11/293,799 | 11/293,796 | 11/293,797 | 11/293,798 |
| 10/760,254 | 10/760,210 | 10/760,202 | 10/760,197 | 10/760,198 | 10/760,249 | 10/760,263 |
| 10/760,196 | 10/760,247 | 10/760,223 | 10/760,264 | 10/760,244 | 10/760,245 | 10/760,222 |
| 10/760,248 | 10/760,236 | 10/760,192 | 10/760,203 | 10/760,204 | 10/760,205 | 10/760,206 |
| 10/760,267 | 10/760,270 | 10/760,259 | 10/760,271 | 10/760,275 | 10/760,274 | 10/760,268 |
| 10/760,184 | 10/760,195 | 10/760,186 | 10/760,261 | 10/760,258 | 11/293,804 | 11/293,840 |
| 11/293,803 | 11/293,833 | 11/293,834 | 11/293,835 | 11/293,836 | 11/293,837 | 11/293,792 |

-continued

| | | | | | | |
|---|---|---|---|---|---|---|
| 11/293,794 | 11/293,839 | 11/293,826 | 11/293,829 | 11/293,830 | 11/293,827 | 11/293,828 |
| 11/293,795 | 11/293,823 | 11/293,824 | 11/293,831 | 11/293,815 | 11/293,819 | 11/293,818 |
| 11/293,817 | 11/293,816 | 11/014,764 | 11/014,763 | 11/014,748 | 11/014,747 | 11/014,761 |
| 11/014,760 | 11/014,757 | 11/014,714 | 11/014,713 | 11/014,762 | 11/014,724 | 11/014,723 |
| 11/014,756 | 11/014,736 | 11/014,759 | 11/014,758 | 11/014,725 | 11/014,739 | 11/014,738 |
| 11/014,737 | 11/014,726 | 11/014,745 | 11/014,712 | 11/014,715 | 11/014,751 | 11/014,735 |
| 11/014,734 | 11/014,719 | 11/014,750 | 11/014,749 | 11/014,746 | 11/014,769 | 11/014,729 |
| 11/014,743 | 11/014,733 | 11/014,754 | 11/014,755 | 11/014,765 | 11/014,766 | 11/014,740 |
| 11/014,720 | 11/014,753 | 11/014,752 | 11/014,744 | 11/014,741 | 11/014,768 | 11/014,767 |
| 11/014,718 | 11/014,717 | 11/014,716 | 11/014,732 | 11/014,742 | 11/097,268 | 11/097,185 |
| 11/097,184 | 11/293,820 | 11/293,813 | 11/293,822 | 11/293,812 | 11/293,821 | 11/293,814 |
| 11/293,793 | 11/293,842 | 11/293,811 | 11/293,807 | 11/293,806 | 11/293,805 | 11/293,810 |
| 09/575,197 | 09/575,195 | 09/575,159 | 09/575,123 | 6,825,945 | 09/575,165 | 6,813,039 |
| 6,987,506 | 09/575,131 | 6,980,318 | 6,816,274 | 09/575,139 | 09/575,186 | 6,681,045 |
| 6,728,000 | 09/575,145 | 09/575,192 | 09/575,181 | 09/575,193 | 09/575,183 | 6,789,194 |
| 6,789,191 | 6,644,642 | 6,502,614 | 6,622,999 | 6,669,385 | 6,549,935 | 09/575,187 |
| 6,727,996 | 6,591,884 | 6,439,706 | 6,760,119 | 09/575,198 | 6,290,349 | 6,428,155 |
| 6,785,016 | 09/575,174 | 09/575,163 | 6,737,591 | 09/575,154 | 09/575,129 | 6,830,196 |
| 6,832,717 | 6,957,768 | 09/575,162 | 09/575,172 | 09/575,170 | 09/575,171 | 09/575,161 |

The disclosures of these applications and patents are incorporated herein by reference.

BACKGROUND OF THE INVENTION

Electronic devices having embedded computer systems are now part of everyday life. Examples of such devices include automatic teller machines (ATMs), mobile telephones, printers, photocopiers, handheld calculators, microwave ovens, televisions, DVD players, washing machines, handheld game consoles etc. Broadly speaking, embedded computer systems are characterized by providing a function (or functions) that is not itself a computer.

Generally, an embedded system contains special-purpose hardware and a processor (CPU) supporting a real-time operating system (RTOS). The system is programmed with special-purpose software tailored to meet the requirements for that particular system. Typically, software written for an embedded system is referred to as 'firmware'. Since electronic devices are expected to run continuously for many years without errors, firmware is usually developed and tested more rigorously than software for computers.

Aside from the obvious operational advantages of an embedded computer system, there is a considerable advantage offered in terms of the manufacture and distribution of various product lines. When a new product is released onto the market, it is often desirable to release the product in different versions, each version having a price commensurate with that particular version. For example, a first product may have Feature X, while a second product may have Features X, Y and Z.

In terms of manufacturing, it is relatively expensive to have one production line dedicated to a first product and another production line dedicated to a second product. It is cheaper to manufacture a single product type that includes the necessary hardware for supporting Features X, Y and Z in all products. In this scenario, various product lines may be differentiated via their embedded firmware. The firmware provides a much cheaper means for differentiating between a range of products, compared to the hardware. Moreover, the firmware allows users to upgrade their devices without having to buy a new device. For example, an authorized Internet download via a personal computer may be used to provide an upgrade, which enables Features Y and Z in a product purchased originally with only Feature X.

However, an inherent problem with embedded firmware is that it is susceptible to malicious attack from hackers or willful copyright infringers offering unauthorized firmware upgrades. For example, an unauthorized firmware upgrade may be freely distributed over the Internet, allowing users to upgrade their devices free of charge.

One way of circumventing this problem is to provide upgrades not via the firmware itself, but via an authentication chip in the device. The use of an authentication chip ('QA chip') in a printer environment was described in our earlier applications listed below, the contents of which are herein incorporated by reference:

| | | | | | | |
|---|---|---|---|---|---|---|
| 10/727,251 | 10/727,159 | 10/727,180 | 10/727,179 | 10/727,192 | 10/727,274 | 10/727,164 |
| 10/727,161 | 10/727,198 | 10/727,158 | 10/754,536 | 10/754,938 | 10/727,227 | 10/727,160 |
| 10/296,522 | 6,795,215 | 10/296,535 | 09/575,109 | 6,805,419 | 6,859,289 | 6,977,751 |
| 6,398,332 | 6,394,573 | 6,622,923 | 6,747,760 | 6,921,144 | 10/884,881 | 10/943,941 |
| 10/949,294 | 11/039,866 | 11/123,011 | 6,986,560 | 7,008,033 | 11/148,237 | 11/248,435 |
| 11/248,426 | 11/298,630 | 09/517,539 | 6,566,858 | 6,331,946 | 6,246,970 | 6,442,525 |
| 09/517,384 | 09/505,951 | 6,374,354 | 09/517,608 | 09/505,147 | 6,757,832 | 6,334,190 |
| 6,745,331 | 09/517,541 | 10/203,559 | 10/203,560 | 10/203,564 | 10/636,263 | 10/636,283 |
| 10/866,608 | 10/902,889 | 10/902,833 | 10/940,653 | 10/942,858 | 10/854,514 | 10/854,519 |
| 10/854,513 | 10/854,499 | 10/854,501 | 10/854,500 | 10/854,502 | 10/854,518 | 10/854,517 |

As described in our earlier applications, QA chip(s) in a printer perform an array of functions in a secure environment. A QA chip in a print cartridge may be used to allow operation of the printer only in a licensed manner. For example, a printer A may be licensed to print at 10 pages per minute, while a printer B may be licensed to print at 30 pages per minute. The hardware in each printer is identical, but the QA chip allows each printer to be differentiated. Moreover, since the QA chip stores its data in a secure, authenticated fashion, it can only be upgraded or replaced by an authentic source. Hence, the QA chip provides protection against attack from unlicensed users.

A QA chip mounted on an ink cartridge may be used to guarantee that the ink contained in the cartridge is from a particular source or of a particular quality, thereby ensuring that incorrect ink, which may damage the printhead, cannot be used. The same QA chip may similarly be used to store dynamically in its memory a quantity of 'virtual ink' remaining in the cartridge, determined with reference to the initial quantity of ink in the cartridge and the number of dots printed using that ink. The quantity of 'virtual ink' provides a security mechanism for the printer and prevents unauthorized refilling of ink cartridges—the firmware in the printer communicates with the ink cartridge QA chip before printing and if the amount of 'virtual ink' is insufficient, the printer will not print. In this way, the quality of ink can be assured and risk of damaging the printhead using low quality ink from an unauthorized refill is minimized.

QA chips provide an excellent means for preventing unauthorized uses of electronic devices. However, the security of QA chips relies on firmware in the embedded system communicating with the chip. It is conceivable that the most determined hacker may be able to modify the firmware and override its communication with QA chip(s) in the device. In this scenario, the security provided by the QA chip would be compromised. In the above example, unauthorized refills of ink cartridges would be possible, irrespective of the presence of a QA chip on the ink cartridge.

It may seem unlikely that such a determined attack on an embedded computer system would be made. However, in the printer market, sales of unauthorized ink refills is becoming a multimillion dollar industry and provides considerable motivation for a malicious attack on any security systems built in to a printer. From the point of view of a printer manufacturer, the use of low quality ink in its printers, resulting in poor print quality and shortened printhead lifetime, has the potential to do incalculable damage to its goodwill and reputation in the printer market.

It would therefore be desirable to provide an electronic device, having an embedded computer system, with improved security from malicious attack.

It would further be desirable to provide such an electronic device, which still allows flexibility for firmware upgrades or even installation of an alternative core RTOS downstream of the device manufacturer.

It would further be desirable to provide a simple means for upgrading firmware in PictBridge printers.

SUMMARY OF THE INVENTION

In a first aspect, there is provided an electronic device comprising an embedded computer system, said device comprising a processor supporting a real-time operating system (RTOS), said processor supporting user and supervisor modes, wherein said computer system is programmed such that only code portions directly controlling essential hardware in said device are run in supervisor mode.

As used herein, "essential hardware" is used to mean hardware component(s) which are essential for the device to perform its primary function. For example, in the case of a printer, the essential hardware may include drive circuitry for actuating nozzle actuators in a printhead, but does not include an LCD display on the printer, since an LCD display is not essential for the printer to be able to print.

As used herein, the term "code portion" is used to mean any portion of code which performs a specific function. A code portion may be part of a thread or a process.

Processors supporting user and supervisor modes are well known in the computer art. Code running in supervisor mode can only be accessed by a person with special privileges, such as the person who wrote the code originally. By contrast, code running in user mode can be accessed and modified by any person, irrespective of their privileges.

An example of a processor, which supports user and supervisor modes, is the SPARC™ processor. Such processors were designed to protect a core (or kernel) of an operating system from potentially buggy applications running on a computer. With the core of the operating system running in supervisor mode, the operating system can continue to run, even if a particular application running in user mode has crashed. This ensures that other applications running in user mode can continue running on the operating system. By protecting the core of the operating system in this way, the risk of crashing the whole computer with a buggy application is minimized—there is a separation between applications and the core of the operating system.

In the present invention, the processor supporting user and supervisor modes is employed in a different manner from its conventional use in non-embedded computer systems. The embedded computer system of the present invention is programmed so that only code portions directly controlling essential hardware in the device are run in supervisor mode, with the remainder of code portions being run in user mode.

A major advantage of running certain code portions (which control essential hardware in the device) in supervisor mode is that these code portions cannot be modified once they have been finalized by the device manufacturer. Hence, the manufacturer, or a licensee, retains ultimate control over how the device may be operated.

For example, a printer manufacturer may program into code portions directly controlling a printhead and paper feed mechanism that the printer should only print at 10 pages per minute. Since this code portion is protected in supervisor mode, it is not possible for a hacker to modify the code and upgrade his printer.

Optionally, the computer system is programmed such that code portions not directly controlling essential hardware in said device are run in user mode. Optionally, a core of the RTOS is run in user mode. The advantages of programming the embedded computer system in this way are twofold. Firstly, the amount of code in supervisor mode is kept to a minimum, which minimizes the risk of bugs being present in this immutable code. Secondly, by having the RTOS and non-essential applications running in user mode, there is an opportunity for a licensed printer manufacturer or distributor, downstream of the original printer manufacturer, to develop its own firmware specific to its requirements on an operating system of its choice. For example, a licensed printer manufacturer may wish to change the format of an LCD display and he may wish to program this using his preferred operating system. In accordance with the present invention, a licensed printer manufacturer has the flexibility to do this, without the security of a QA system in the device being compromised.

Optionally, the computer system is programmed such that a code portion directly controlling essential hardware is callable from an application running in user mode via a trap identifying that code portion. A plurality of code portions, each directly controlling respective essential hardware, may each be independently callable from an application running in user mode via a respective trap identifying a respective code portion.

An advantage of being able to call up a particular code portion from user mode is that it provides further flexibility for programming specific operation sequences into the device. User mode applications may be programmed by a licensed device manufacturer or may even be available via an upgrade, downloadable from the Internet. For example, a printer user may wish to have a default option of printing '5000 pages, full color'. He is able to upgrade his firmware to have this default option, because the print job application(s) programmed into the embedded system run in user mode.

Optionally, the code portion directly controlling essential hardware communicates with at least one authentication chip in the device before an operation of the hardware. The authentication chip (or 'QA chip') authorizes the operation. For example, the code portion may ask the QA chip for the authorized print speed for that printer. The QA chip returns this information (e.g. 10 pages per minute) to the computer system and printing at the authorized print speed can commence. In this way, licensed operation of the device can be controlled securely via the QA chip, without being compromised by a malicious attack on firmware in the device.

Optionally, a first authentication chip is associated with a consumable component of said device. Examples of consumable components in electronic devices include ink cartridges, toner, paper, batteries etc. The first authentication chip may contain static and/or dynamic data relating to the consumable component. For example, static data may relate to a source, batch number, quality (e.g. ink color), initial quantity etc. of the consumable component. Dynamic data may relate to a current quantity (e.g. amount of remaining ink) or quality (e.g. temperature) of the consumable component.

An electronic device may require several consumable components. Accordingly, the device may comprise a plurality of first authentication chips, each one of the first authentication chips being associated with a respective consumable component.

Optionally, the electronic device is a printer and the consumable component is an ink cartridge having a respective first authentication chip. The authentication chip on an ink cartridge may be used to authorize printing only if certain conditions have been met e.g. (i) printing only when an ink cartridge of a predetermined type, as determined via the associated authentication chip, is loaded in the printer; and/or (ii) printing only when a predetermined amount of ink, as determined via the associated authentication chip, is remaining in the ink cartridge. As described earlier, these authentication mechanisms provide a printer manufacturer with assurances regarding the quality of ink used in its printers, thereby preserving the manufacturer's reputation in the printer market.

Optionally, a second authentication chip is positioned in a body of the device, which is not associated with a consumable component. For example, a second authentication chip may be mounted in or on a print engine for a printer. The second authentication chip may be used to authorize certain operations of the device, such as printing at a predetermined speed.

In a second aspect, there is provided a system for upgrading firmware in a PictBridge printer, the system comprising:

a PictBridge printer having an embedded computer system; and a memory stick for communicating with said embedded computer system, wherein said memory stick contains a firmware upgrade for said embedded computer system.

In a third aspect, there is provided a memory stick containing a firmware upgrade for an embedded computer system of a PictBridge printer.

In a fourth aspect, there is provided a system for upgrading firmware in a PictBridge printer, the system comprising:

a PictBridge printer having an embedded computer system; and a digital camera for communicating with said embedded computer system, wherein said camera contains a firmware upgrade for said embedded computer system.

In a fifth aspect, there is provided a digital camera containing a firmware upgrade for an embedded computer system of a PictBridge printer.

PictBridge is an industry open standard from the Camera & Imaging Products Association (CIPA) for direct printing. It allows images to be printed directly from digital cameras to a printer, without having to connect the camera to a computer. By connecting a PictBridge-enabled printer to a PictBridge-enabled camera using a single USB cable, users can easily control print settings using their camera and produce high quality photos without using a PC. A major advantage of PictBridge printing is its simplicity for the user, and especially those users for whom complex photo application software may be a barrier.

PictBridge relies on communication between embedded computer systems in the camera and printer. These embedded computer systems effectively replace PC photo applications and, moreover, simplify operability for the user.

From time to time, it may be necessary to upgrade firmware in a PictBridge printer. For example, additional printing options may be required or it may be necessary to upgrade firmware so that it is compatible with new PictBridge-enabled cameras on the market.

In traditional digital camera systems, software upgrades for PC photo applications are provided via internet downloads or CD. However, many PictBridge printer users may not own a computer in the first place. For those that do own a computer, the complexity of downloading new software onto their PC from the internet and upgrading their PictBridge printer by connecting it to their PC is likely to be a significant barrier. After all, PictBridge users are generally attracted to this system, because of its simplicity and because it obviates the need for a PC.

A major advantage of the present invention is its simplicity for the user. Insertion of a memory stick into a USB port of a PictBridge printer requires no computer skills. Therefore, firmware upgrades of a printer may be confidently performed by anyone without risk or fear of upgrading the printer incorrectly.

As used herein, the term "memory stick" is used to mean any portable non-volatile digital memory device.

The memory stick or camera may communicate with the embedded computer system via standard USB connectors.

Optionally, the memory stick or camera is configured to download automatically a firmware upgrade to the printer if it detects that the printer does not already have that upgrade.

Optionally, the portable non-volatile digital memory device is a memory stick.

The camera may be sold with the firmware upgrade already programmed into its memory. Alternatively, the camera may receive the firmware upgrade from an external source. For example, a memory stick may be used to download the firmware upgrade to the camera so that the camera can upgrade the printer when it is next connected.

BRIEF DESCRIPTION OF THE DRAWINGS

A specific embodiment of the invention will now be described in detail, with reference to the following drawings in which.

DETAILED DESCRIPTION OF A SPECIFIC EMBODIMENT

Embedded System with User and Supervisor Modes

Figure 1:
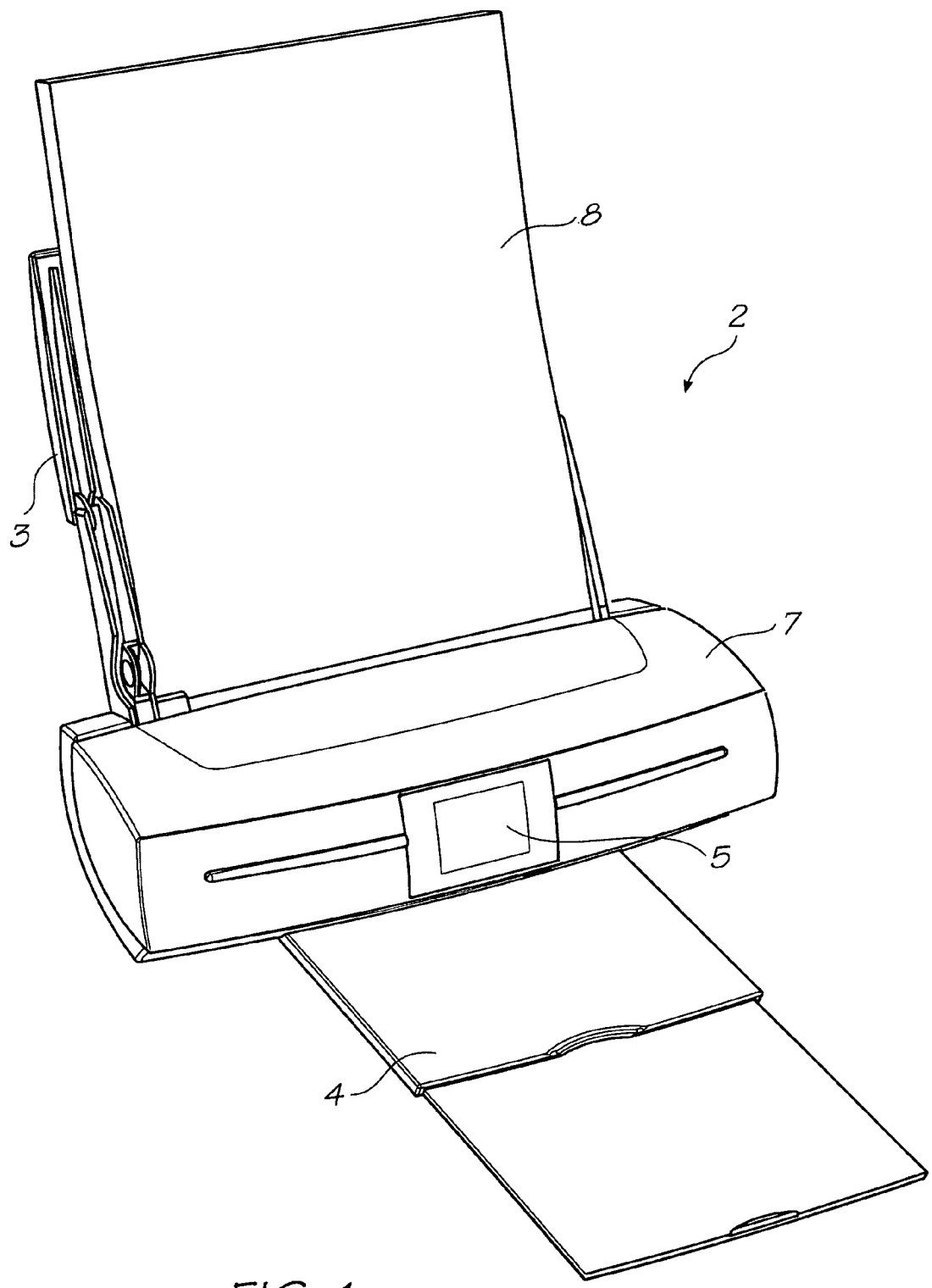
FIG. 1 is a perspective view of a printer having an embedded computer system.

FIG. 1 shows a printer 2 embodying the present invention. Media supply tray 3 supports and supplies media 8 to be printed by a print engine (concealed within a printer casing). Printed sheets of media 8 are fed from the print engine to a media output tray 4 for collection. User interface 5 is an LCD touch screen and enables a user to control the operation of the printer 2. The printer 2 comprises an embedded computer system (not shown), which controls the overall operation of the printer.

Figure 2:
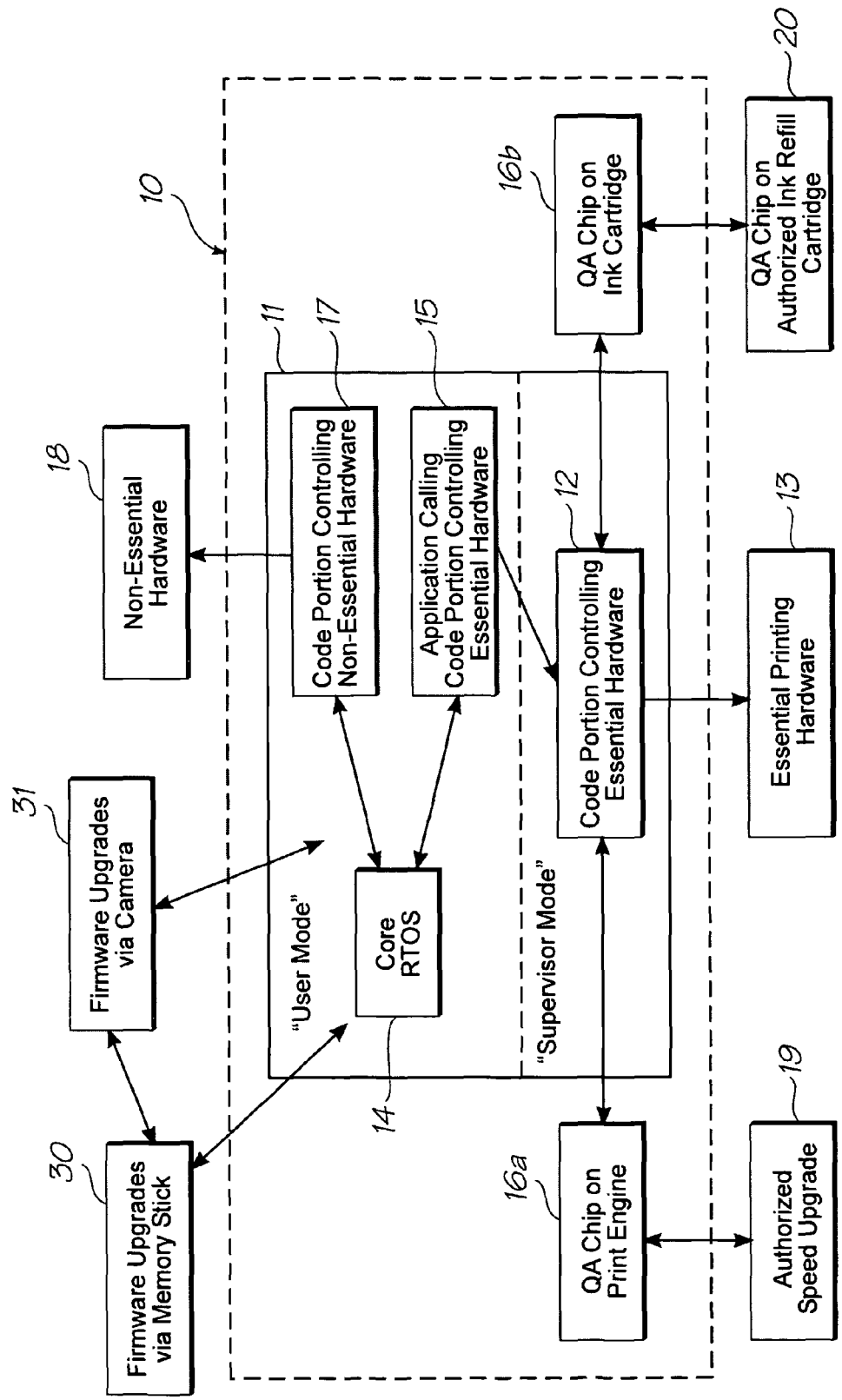
FIG. 2 is a diagram showing the interrelationship between various components of the embedded computer system and printer hardware.

Turning to FIG. 2, there is shown schematically the embedded computer system 10 and its interrelationship with printer hardware and other external components. The embedded computer system 10 comprises a processor 11, which supports user and supervisor modes. The processor 11 runs code portions 12 controlling essential printing hardware 13 in supervisor mode only. The essential printing hardware 13 may comprise drive circuitry for actuating nozzle actuators, motors driving a feed mechanism etc. All other code is run in user mode, including the core RTOS 14.

Applications 15 running in user mode control printer operations indirectly via traps which call up code portions 12. In this way, the integrity of the code portions 12 is protected, whilst still allowing some flexibility on exactly how the printer is operated.

The code portions 12 are in communication with a print engine QA chip 16a and one or more ink cartridge QA chips 16b in the printer. Before any operation of essential printing hardware 13, the code portions 12 communicate with the QA chips 16a and 16b to request authorization for that operation.

The print engine QA chip 16a is programmed with an authorized print speed (e.g. 30 pages per minute). This information is returned to the code portions 12 and the essential printing hardware 13 is operated in accordance with the authorized print speed.

The ink cartridge QA chip 16b is programmed with information regarding the ink, including an amount of remaining ink. If, for example, the ink cartridge QA chip 16b returns information that no ink is remaining in the cartridge, then the code portions 12 are not authorized to operate the essential printing hardware 13 and printing is aborted.

Since the code portions 12 are run in supervisor mode only, it is not possible for an unauthorized person to modify these code portions and, hence, it is not possible to change the operation of essential printing hardware 13 or override the security provided by the QA chips 16a and 16b.

On the other hand, code portions 17 controlling non-essential hardware 18, such as the LCD display 5, are run in user mode. These code portions 17, together with the core RTOS 14, can be modified without any authorization privileges, to provide flexibility in operation of non-essential hardware and even flexibility in selecting a desired operating system.

With the embedded system 10 arranged as described above, all printer upgrades and ink refills can be reliably controlled via the QA chips 16a and 16b. The print engine QA chip 16a may receive a print speed upgrade 19 via an authorized internet download or memory stick. Likewise, an ink refill QA chip 20 may communicate with the ink cartridge QA chip 16b during an authorized ink refill, so that the ink cartridge QA chip 16b knows a refill from an authentic source has taken place. Authorized ink refill operations are described in detail in our earlier U.S. patent application Ser. No. 11/014,769 (filed on Dec. 12, 2004), the contents of which is hereby incorporated by reference.

Firmware Upgrades

As described above, the majority of firmware in the embedded system 10 for printer 2 may be modified or upgraded without compromising the security of licensed printer operations. Some firmware upgrades may be provided by the user.

Referring to FIG. 2, a firmware upgrade may be provided by a memory stick 30 or a camera 31. The memory stick 30 or camera 31 contains the firmware upgrade in its memory and automatically downloads the upgrade to the embedded system 10 if it detects that the embedded system requires upgrading.

In the case of the memory stick 30, the user simply plugs the memory stick into a USB port of a PictBridge printer.

In the case of the camera 31, the user simply connects the camera to a Pictbridge printer via its USB port in the normal way. The user may even be unaware that a firmware upgrade has taken place if the camera was purchased with the upgrade contained in its memory. Alternatively, the memory stick 30 may be used to download a firmware upgrade into the camera's memory, and the camera 31 used to upgrade firmware in the embedded system 10 when the camera is next connected to the printer 2.

It will, of course, be appreciated that the present invention has been described purely by way of example and that modifications of detail may be made within the scope of the invention, which is defined by the accompanying claims.

The invention claimed is:

1. An electronic device comprising an embedded computer system, said device comprising a processor supporting a real-time operating system (RTOS), said processor supporting user and supervisor modes, wherein said computer system is programmed such that only code portions directly controlling essential hardware in said device are run in supervisor mode,
   wherein said device is a printer and said essential hardware comprises drive circuitry for actuating nozzle actuators in a printhead,
   said code portion is programmed to allow only an authorized operation of said hardware, said authorized operation being selected from: printing at a predetermined speed; printing at a predetermined resolution; full color printing; and monochrome printing.

2. The electronic device of claim 1, wherein said computer system is programmed such that code portions not directly controlling essential hardware in said device are run in user mode.

3. The electronic device of claim 1, wherein a core of said real-time operating system (RTOS) runs in user mode.

4. The electronic device of claim 1, wherein said computer system is programmed such that a code portion directly controlling essential hardware is callable from an application running in user mode via a trap identifying said code portion.

* * * * *